US009018928B2

(12) United States Patent
Dearborn et al.

(10) Patent No.: US 9,018,928 B2
(45) Date of Patent: Apr. 28, 2015

(54) RELATIVE EFFICIENCY MEASUREMENT IN A PULSE WIDTH MODULATION SYSTEM

(75) Inventors: Scott Dearborn, Brackney, PA (US); Terry L. Cleveland, Endicott, NY (US); Clifford N. Ellison, III, Campbell, NY (US)

(73) Assignee: Microchip Technology Incorporated, Chandler, AZ (US)

( * ) Notice: Subject to any disclaimer, the term of this patent is extended or adjusted under 35 U.S.C. 154(b) by 559 days.

(21) Appl. No.: 13/313,223

(22) Filed: Dec. 7, 2011

(65) Prior Publication Data

US 2012/0169308 A1 Jul. 5, 2012

Related U.S. Application Data

(60) Provisional application No. 61/427,856, filed on Dec. 29, 2010.

(51) Int. Cl.
*H02M 3/157* (2006.01)
*H02M 3/158* (2006.01)
*H02M 1/00* (2006.01)

(52) U.S. Cl.
CPC .......... *H02M 3/157* (2013.01); *H02M 3/1588* (2013.01); *H02M 2001/0048* (2013.01); *Y02B 70/1466* (2013.01); *Y02B 70/1491* (2013.01)

(58) Field of Classification Search
USPC .......... 323/271, 282, 283, 285; 700/297, 298, 700/32
See application file for complete search history.

(56) References Cited

U.S. PATENT DOCUMENTS

| | | | | |
|---|---|---|---|---|
| 7,737,669 | B2* | 6/2010 | Jain | 323/272 |
| 7,825,642 | B1* | 11/2010 | Young et al. | 323/224 |
| 7,911,193 | B2* | 3/2011 | Galvano et al. | 323/284 |
| 8,125,200 | B2* | 2/2012 | Tsai et al. | 323/267 |
| 8,289,010 | B1* | 10/2012 | Fernald et al. | 323/283 |
| 2004/0189264 | A1* | 9/2004 | Matsuura et al. | 323/224 |
| 2005/0231181 | A1* | 10/2005 | Bernacchia et al. | 323/274 |
| 2006/0022648 | A1* | 2/2006 | Ben-Yaakov et al. | 323/222 |
| 2009/0146630 | A1* | 6/2009 | Naka | 323/283 |
| 2011/0062929 | A1* | 3/2011 | Strydom et al. | 323/284 |

OTHER PUBLICATIONS

International Search Report and Written Opinion, Application No. PCT/US2011/064186, 11 pages, May 10, 2013.

* cited by examiner

*Primary Examiner* — Fred E Finch, III
(74) *Attorney, Agent, or Firm* — King & Spalding L.L.P.

(57) ABSTRACT

A pulse width modulation (PWM) power conversion system has improved efficiency over a wide operating input voltage and load range. Being able to measure relative efficiency of an analog PWM system allows enhanced control while maintaining the benefits of analog control. An analog low pass filter produces an average value of the PWM pulse train, then this analog average value is converted into digital values with an analog-to-digital converter and stored so that relative efficiencies of the PWM power conversion system may be compared for various combinations of operating parameters.

38 Claims, 3 Drawing Sheets

RELATIVE EFFICIENCY MEASUREMENT IN A PULSE WIDTH MODULATION SYSTEM

RELATED PATENT APPLICATION

This application claims priority to commonly owned U.S. Provisional Patent Application Ser. No. 61/427,856; filed Dec. 29, 2010; entitled "Relative Efficiency Measurement in a Pulse Width Modulation System," by Scott Dearborn, Terry L. Cleveland, and Clifford Ellison III, and is hereby incorporated by reference herein for all purposes.

TECHNICAL FIELD

The present disclosure relates to pulse width modulation (PWM) systems, and, more particularly, to measuring the relative efficiency of an analog PWM system and using the measured efficiency in determining optimal operating parameters, system health and potential for PWM system failures.

BACKGROUND

Ways to improve efficiency of power/energy conversion systems are continually being sought. For example, switch-mode power supply (SMPS) applications. The SMPS topology is gaining wider acceptance because of its high efficiency, small size and light weight. However, as the size of an SMPS is decreased, heat dissipation/removal therefrom becomes more problematic. Even though the typical efficiency of an SMPS may be 90 percent, there still remains 10 percent of the energy used by the SMPS becoming wasted heat. In addition, the high efficiency of the SMPS is optimized for only a single load condition. However, in real world applications power utilization loads vary over a wide range, and so do the associated SMPS efficiencies at those loads. Therefore, any further improvements in SMPS efficiency will result in even smaller and more cost effective solutions in addition to more energy savings. The size, weight and power savings have significant value. In addition, it is desirable to determine the health of an SMPS system, adjust operating parameters for maximum efficiency, and be able to predict a potential system failure.

SUMMARY

Therefore a need exists for a power/energy conversion switch-mode power supply (SMPS) that is capable of improved efficiencies in a smaller, simpler system solution. This may be accomplished by averaging the PWM control signal and periodically taking samples of the averaged PWM control signal in determining relative efficiency of the SMPS system and best practices in maintaining the maximum efficiency thereof over all load conditions. Also by knowing the PWM control signal averages during operation thereof, a baseline can be established so that the health and potential system failures may be determined and monitored.

According to an embodiment, a switch-mode power supply (SMPS) may comprise at least one power switch coupled to a voltage source; a power inductor coupled to the at least one power switch; a filter capacitor coupled to a load side of the power inductor that provides a regulated voltage output of the SMPS; at least one driver coupled to the at least one power switch; a pulse width modulation (PWM) generator having at least one output coupled to and controlling the at least one driver, the at least one output of the PWM generator providing at least one PWM signal comprising a plurality of pulses; a digital processor having a memory, the digital processor is coupled to and provides operating parameters to the PWM generator during operation thereof; a voltage comparison circuit for comparing the regulated output voltage to a reference voltage, wherein the voltage comparison circuit has an error signal output representative of a difference between the regulated output voltage and the reference voltage; a comparator having a first input coupled to the error signal output from the voltage comparison circuit, a second input coupled to a ramp signal, and an output coupled to an input of the PWM generator; an PWM averaging filter, wherein the PWM averaging filter receives the PWM signal and produces an analog signal representative of a relative efficiency thereof; and an analog-to-digital converter (ADC) having an analog input coupled to the analog signal representative of the relative efficiency of the PWM signal, and a digital output coupled to the digital processor having a memory; wherein the digital processor optimizes operation of the SMPS by adjusting operating parameters of the PWM generator to provide the at least one PWM signal that produces a highest relative efficiency of the SMPS.

According to a further embodiment, the highest relative efficiency is when the analog signal representative of the relative efficiency is at a lowest value. According to a further embodiment, the ramp signal may represent current values of the power inductor. According to a further embodiment, the ramp signal may represent a generated voltage ramp. According to a further embodiment, the digital processor may store in the memory digital efficiency values from the digital output of the ADC. According to a further embodiment, the digital processor may use the stored digital efficiency values to adjust the operating parameters of the PWM generator to provide the PWM signal resulting in optimum relative efficiency of the SMPS. According to a further embodiment, the operating parameters of the PWM generator can be selected from any one or more of the group consisting of on and off percents of the at least one power switch, drive current from the at least one driver to the at least one power switch, and PWM pulse rate per second (frequency). According to a further embodiment, the at least one power switch can be at least one power transistor. According to a further embodiment, the at least one power transistor can be at least one power metal oxide semiconductor (MOS) field effect transistor (FET). According to a further embodiment, the PWM averaging filter can be coupled to the at least one driver for receiving the PWM signal. According to a further embodiment, the PWM averaging filter can be an analog low-pass filter. According to a further embodiment, the analog low-pass filter can be a resistor-capacitor low-pass filter. According to a further embodiment, the SMPS may further comprise a communications interface coupled to the digital processor. According to a further embodiment, the digital processor and memory can be a microcontroller.

According to another embodiment, a switch-mode power supply (SMPS), may comprise a first power switch coupled to a voltage source; a second power switch coupled between the first power switch and a voltage source return; a power inductor coupled to the first and second power switches; a filter capacitor coupled to a load side of the power inductor that provides a regulated voltage output of the SMPS; a first driver coupled to the first power switch; a second driver coupled to the second power switch; a pulse width modulation (PWM) generator having first and second outputs coupled to and controlling the first and second drivers, respectively, the first and second outputs of the PWM generator providing first and second PWM signals, each comprising a plurality of pulses; a digital processor having a memory, the digital processor is coupled to and provides operating parameters to the PWM generator during operation thereof; a voltage comparison circuit for comparing the regulated output voltage to a reference voltage, wherein the voltage comparison circuit has an error signal output representative of a difference between the regulated output voltage and the reference voltage; a comparator having a first input coupled to the error signal output from the voltage comparison circuit, a second input coupled to a ramp signal, and an output coupled to an input of the PWM generator; a first PWM averaging filter, the first PWM averaging filter receives the first PWM signal and produces a first analog signal representative of a relative efficiency thereof; and an analog-to-digital converter (ADC) having an analog input coupled to the first analog signal representative of the relative efficiency of the first PWM signal, and a digital output coupled to the digital processor having a memory; wherein the digital processor optimizes operation of the SMPS by adjusting operating parameters of the PWM generator to provide the first and second PWM signals that produce a highest relative efficiency of the SMPS.

According to a further embodiment, the highest relative efficiency can be reached when the analog signal representative of the relative efficiency is at a lowest value. According to a further embodiment, the ramp signal may represent current values of the power inductor. According to a further embodiment, the ramp signal may represent a generated voltage ramp. According to a further embodiment, the digital processor may store in the memory digital efficiency values from the digital output of the ADC. According to a further embodiment, the digital processor may use the stored digital efficiency values to adjust the operating parameters of the PWM generator to provide the PWM signal resulting in optimum relative efficiency of the SMPS. According to a further embodiment, the operating parameters of the PWM generator can be selected from any one or more of the group consisting of on and off percents of the first power switch, on and off percents of the second power switch, drive current from the first driver to the first power switch, drive current from the second driver to the second power switch, off times between on times of the first and second PWM signals, and PWM pulse rate per second (frequency). According to a further embodiment, the SMPS may further comprise a second PWM averaging filter, the second PWM averaging filter receives the second PWM signal and produces a second analog signal representative of a relative efficiency thereof, wherein the second analog signal is coupled to another analog input of the ADC. According to a further embodiment, the first and second power switches can be power transistors. According to a further embodiment, the power transistors can be power metal oxide semiconductor (MOS) field effect transistors (FETs). According to a further embodiment, the second PWM averaging filter can be coupled to the second driver for receiving the second PWM signal. According to a further embodiment, the first PWM averaging filter can be coupled to the first driver for receiving the first PWM signal. According to a further embodiment, the first PWM averaging filter can be an analog low-pass filter. According to a further embodiment, the analog low-pass filter can be a resistor-capacitor low-pass filter. According to a further embodiment, the SMPS may further comprise a communications interface coupled to the digital processor. According to a further embodiment, the digital processor and memory can be a microcontroller.

According to yet another embodiment, a method for optimizing efficiency of a switch-mode power supply (SMPS), may comprise the steps of: determining an average of on pulses of a PWM signal from a PWM generator with a PWM averaging filter; driving a power switch of a SMPS with the PWM signal; and adjusting operating parameters of the PWM generator to minimize the average of the on pulses of the PWM signal and thereby increase efficiency of the SMPS.

According to a further embodiment of the method, the operating parameters of the PWM generator can be selected from any one or more of the group consisting of percent on of the pulses of the PWM signal, drive current to a power switch, and PWM pulse rate per second (frequency).

According to yet another embodiment, a method for optimizing efficiency of a switch-mode power supply (SMPS) controller, may comprise the steps of: determining an average of on pulses of a first PWM signal from a PWM generator with a first PWM averaging filter; driving a first power switch of a SMPS with the first PWM signal; driving a second power switch of the SMPS with a second PWM signal; and adjusting operating parameters of the PWM generator to minimize the average of the on pulses of the first PWM signal and thereby increase efficiency of a SMPS.

According to a further embodiment of the method, the operating parameters of the PWM generator can be selected from any one or more of the group consisting of percent on times of the pulses of the PWM signal, drive current to the first power switch, drive current to the second power switch, off times between on times of the first and second power switches, and PWM pulse rate per second (frequency). According to a further embodiment of the method, the method may further comprise the steps of: determining an average of on pulses of the second PWM signal from the PWM generator with a second PWM averaging filter; and adjusting operating parameters of the PWM generator to minimize the average of the on pulses of the second PWM signal and thereby increase efficiency of the SMPS.

According to yet another embodiment, a method for optimizing operation of a switch-mode power supply (SMPS), may comprise the steps of: providing at least one power switch coupled to a voltage source; providing a power inductor coupled to the at least one power switch; providing a filter capacitor coupled to a load side of the power inductor that provides a regulated voltage from the SMPS; and providing a SMPS controller, wherein operating the SMPS controller comprises the steps of: driving the at least one power switch with an associated at least one driver, controlling the at least one driver with a pulse width modulation (PWM) signal from a PWM generator, comparing the regulated voltage from the SMPS to a reference voltage with a voltage comparison circuit, generating a voltage error signal representative of a difference between the regulated voltage and the reference voltage with the voltage comparison circuit, coupling the voltage error signal to the PWM generator, determining an average of on pulses of the PWM signal with a PWM averaging filter; and adjusting operating parameters of the PWM generator to minimize the average of the on pulses of the PWM signal and thereby increase efficiency of the SMPS.

According to a further embodiment of the method, the operating parameters of the PWM generator are selected from any one or more of the group consisting of percent on of the pulses of the PWM signal, drive current to the at least one power switch, and PWM pulse rate per second (frequency).

According to yet another embodiment, a method for optimizing operation of a switch-mode power supply (SMPS) may comprise the steps of: providing a first power switch coupled to a voltage source; providing a second power switch coupled between the first power switch and a voltage source return; providing a power inductor coupled to the first and second power switches; providing a filter capacitor coupled to a load side of the power inductor that provides a regulated voltage from the SMPS; and providing a SMPS controller, wherein operating the SMPS controller comprises the steps of: driving the first power switch with a first driver, driving the second power switch with a second driver, controlling the first and second drivers with first and second pulse width modulation (PWM) signals, respectively, from a PWM generator, comparing the regulated voltage from the SMPS to a reference voltage with a voltage comparison circuit, generating a voltage error signal representative of a difference between the regulated voltage and the reference voltage with the voltage comparison circuit, coupling the voltage error signal to the PWM generator, determining an average of on pulses of the first PWM signal with a first PWM averaging filter; and adjusting operating parameters of the PWM generator to minimize the average of the on pulses of the first PWM signal and thereby increase efficiency of the SMPS.

According to a further embodiment of the method, the operating parameters of the PWM generator can be selected from any one or more of the group consisting of percent on times of the pulses of the first and second PWM signals, drive currents to the first and second power switches, off times between on times of the first and second power switches, and PWM pulse rate per second (frequency). According to a further embodiment of the method, the method may further comprise the steps of: determining an average of on pulses of the second PWM signal from the PWM generator with a second PWM averaging filter; and adjusting operating parameters of the PWM generator to minimize the average of the on pulses of the second PWM signal and thereby increase efficiency of the SMPS.

BRIEF DESCRIPTION OF THE DRAWINGS

A more complete understanding of the present disclosure thereof may be acquired by referring to the following description taken in conjunction with the accompanying drawings wherein.

Figures 1, 2:
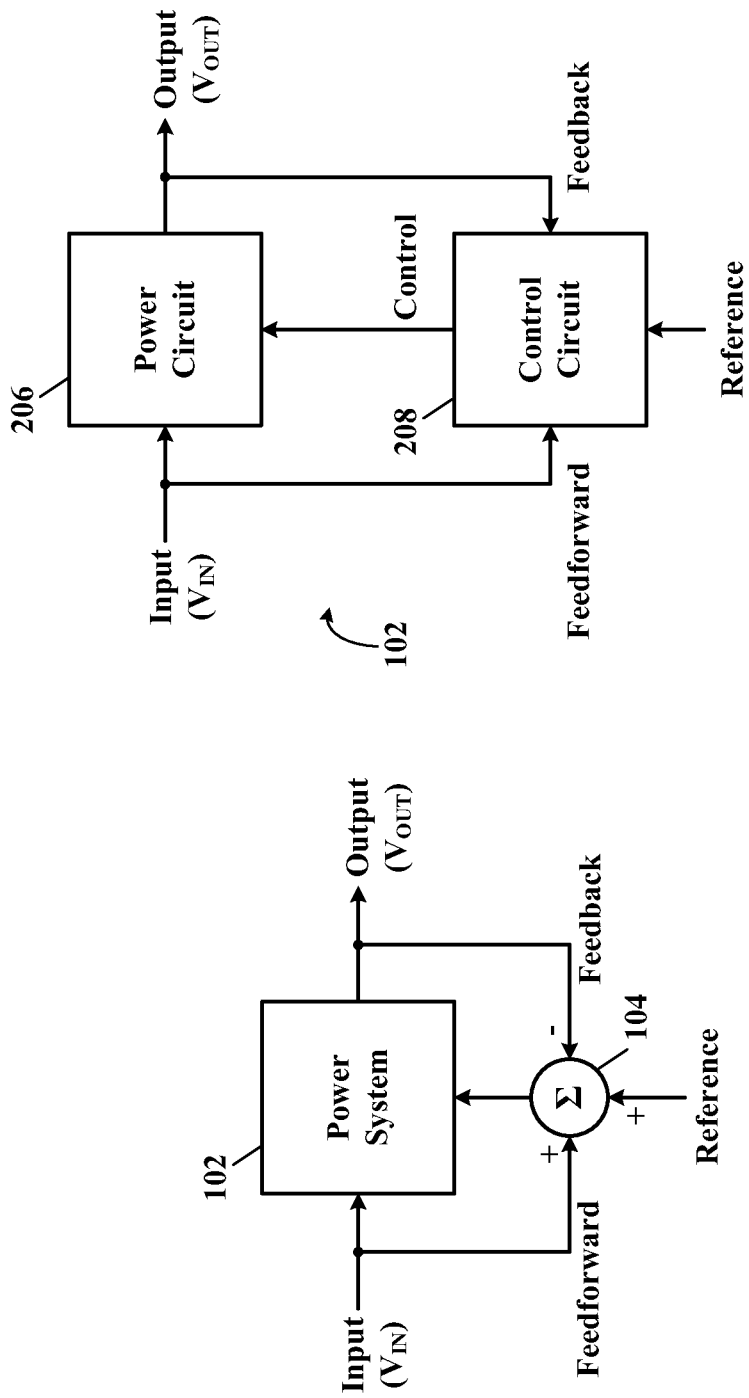
FIG. 1 illustrates a schematic block diagram of a basic voltage regulator system.
FIG. 2 illustrates a more detailed schematic block diagram of the voltage regulator system shown in FIG. 1.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims.

DETAILED DESCRIPTION

A pulse width modulation (PWM) power conversion system has improved efficiency over a wide operating input voltage and load range. Being able to measure relative efficiency of an analog PWM system allows enhanced control while maintaining the benefits of analog control. An analog low pass filter produces an average value of the PWM pulse train, then this analog average value is converted into digital values with an analog-to-digital converter and stored so that relative efficiencies of the PWM power conversion system may be compared for various combinations of operating parameters.

According to the teachings of this disclosure, a low pass, e.g., resistor-capacitor (RC), filter may be used to average the PWM control signal used in a SMPS system. An analog-to-digital converter (ADC) may convert the analog output of the low pass filter to digital values that may be stored in a digital format. PWM system parameters can be adjusted (e.g., fine tuned) while the digitally stored relative efficiency values are checked for each parameter change, and/or combinations thereof. Efficiency reference points may be set so as to be able to identify SMPS system component potential malfunction and reliability issues. It is contemplated and within the scope of this disclosure that any power/energy conversion systems utilizing PWM control would benefit from averaging the PWM control signal for determining system efficiencies during operation thereof and any changes in operating parameters thereto.

According to a specific example embodiment of this disclosure, a switch-mode power supply (SMPS) comprises: at least one power switch coupled to a voltage source; a power inductor coupled to the at least one power switch; a filter capacitor coupled to a load side of the power inductor that provides a regulated voltage output of the SMPS; at least one driver coupled to the at least one power switch; a pulse width modulation (PWM) generator having at least one output coupled to and controlling the at least one driver, the at least one output of the PWM generator providing at least one PWM signal comprising a plurality of pulses; a digital processor having a memory, the digital processor is coupled to and provides operating parameters to the PWM generator during operation thereof; a voltage comparison circuit for comparing the regulated output voltage to a reference voltage, wherein the voltage comparison circuit has an error signal output representative of a difference between the regulated output voltage and the reference voltage; a comparator having a first input coupled to the error signal output from the voltage comparison circuit, a second input coupled to a ramp signal, and an output coupled to an input of the PWM generator; an PWM averaging filter, wherein the PWM averaging filter receives the PWM signal and produces an analog signal representative of a relative efficiency thereof; and an analog-to-digital converter (ADC) having an analog input coupled to the analog signal representative of the relative efficiency of the PWM signal, and a digital output coupled to the digital processor having a memory; wherein the digital processor optimizes operation of the SMPS by adjusting operating parameters of the PWM generator to provide the at least one PWM signal that produces a highest relative efficiency of the SMPS.

According to another specific example embodiment of this disclosure, a switch-mode power supply (SMPS) comprises: a first power switch coupled to a voltage source; a second power switch coupled to a voltage source return; a power inductor coupled to the first and second power switches; a filter capacitor coupled to a load side of the power inductor that provides a regulated voltage output of the SMPS; a first driver coupled to the first power switch; a second driver coupled to the second power switch; a pulse width modulation (PWM) generator having first and second outputs coupled to and controlling the first and second drivers, respectively, the first and second outputs of the PWM generator providing first and second PWM signals, each comprising a plurality of pulses; a digital processor having a memory, the digital processor is coupled to and provides operating parameters to the PWM generator during operation thereof; a voltage comparison circuit for comparing the regulated output voltage to a reference voltage, wherein the voltage comparison circuit has an error signal output representative of a difference between the regulated output voltage and the reference voltage; a comparator having a first input coupled to the error signal output from the voltage comparison circuit, a second input coupled to a ramp signal, and an output coupled to an input of the PWM generator; a first PWM averaging filter, the first PWM averaging filter receives the first PWM signal and produces a first analog signal representative of a relative efficiency thereof; and an analog-to-digital converter (ADC) having an analog input coupled to the first analog signal representative of the relative efficiency of the first PWM signal, and a digital output coupled to the digital processor having a memory; wherein the digital processor optimizes operation of the SMPS by adjusting operating parameters of the PWM generator to provide the first and second PWM signals that produce a highest relative efficiency of the SMPS.

According to yet another specific example embodiment of this disclosure, a method for optimizing efficiency of a switch-mode power supply (SMPS), said method comprising the steps of: determining an average of on pulses of a PWM signal with a PWM averaging filter; and adjusting operating parameters of a PWM generator to minimize the average of the on pulses of the PWM signal and thereby increase efficiency of the SMPS. Wherein the operating parameters of the PWM generator are selected from any one or more of the group consisting of percent on of the pulses of the PWM signal, drive current to a power switch, and PWM pulse rate per second (frequency).

Referring now to the drawing, the details of specific example embodiments are schematically illustrated. Like elements in the drawings will be represented by like numbers, and similar elements will be represented by like numbers with a different lower case letter suffix.

In a general sense, a power converter can be defined as a device which converts one form of energy into another on a continuous basis. Any storage or loss of energy within such a power system while it is performing its conversion function is usually identical to the process of energy translation. There are many types of devices which can provide such a function with varying degrees of cost, reliability, complexity, and efficiency.

The mechanisms for power conversion can take many basic forms, such as those which are mechanical, electrical, or chemical processing in nature. The focus herein will be on power converters which perform energy translation electrically and in a dynamic fashion, employing a restricted set of components which include inductors, capacitors, transformers, switches and resistors. How these circuit components are connected is determined by the desired power translation. Resistors introduce undesirable power loss. Since high efficiency is usually an overriding requirement in most applications, resistive circuit elements should be avoided or minimized in a main power control path. Only on rare occasions and for very specific reasons are power consuming resistances introduced into the main power control path. In auxiliary circuits, such as sequence, monitor, and control electronics of total system, high value resistors are common place, since their loss contributions are usually insignificant.

Referring to FIG. 1, depicted is a schematic block diagram of a basic voltage regulator system. A power system 102, e.g., a basic switch-mode power converter where an input of an uncontrolled source of voltage (or current, or power) is applied to the input of the power system 102 with the expectation that the voltage (or current, or power) at the output will be very well controlled. The basis of controlling the output is to compare it to some form of reference, and any deviation between the output and the reference becomes an error. In a feedback-controlled system, negative feedback is used to reduce this error to an acceptable value, as close to zero as is required by the system. It is desirable, typically, to reduce the error quickly, but inherent with feedback control is the trade-off between system response and system stability. The more responsive the feedback network is, the greater becomes the risk of instability.

At this point, it should be mentioned that there is another method of control—feed forward. With feed forward control, a control signal is developed directly in response to an input variation or perturbation. Feed forward is less accurate than feedback since output sensing is not involved, however, there is no delay waiting for an output error signal to be developed, and feed forward control cannot cause instability. It should be clear that feed forward control typically is not adequate as the only control method for a voltage regulator, but it is often used together with feedback to improve a regulator's response to dynamic input variations.

Referring to FIG. 2, depicted is a more detailed schematic block diagram of the voltage regulator system shown in FIG. 1. The power system 102 has been separated into two blocks: the power circuit 206 and the control circuit 208. The power circuit 206 handles the power system load current and is typically large, robust, and subject to wide temperature fluctuations. Its switching functions are by definition, large-signal phenomenon, normally simulated in most stability analyses as just a two-state switch with a duty cycle. The output filter (not shown) is also considered as a part of the power circuit 206, but can be considered as a linear block. The control circuit 208 will normally be made up of a gain block, an error amplifier, and a pulse-width modulator, used to define the duty cycle for the power switches. According to the teachings of this disclosure, the control circuit 208 is optimized to respond to disturbances in the power system 102 while maintaining a desired output voltage, $V_{OUT}$.

Figure 3:
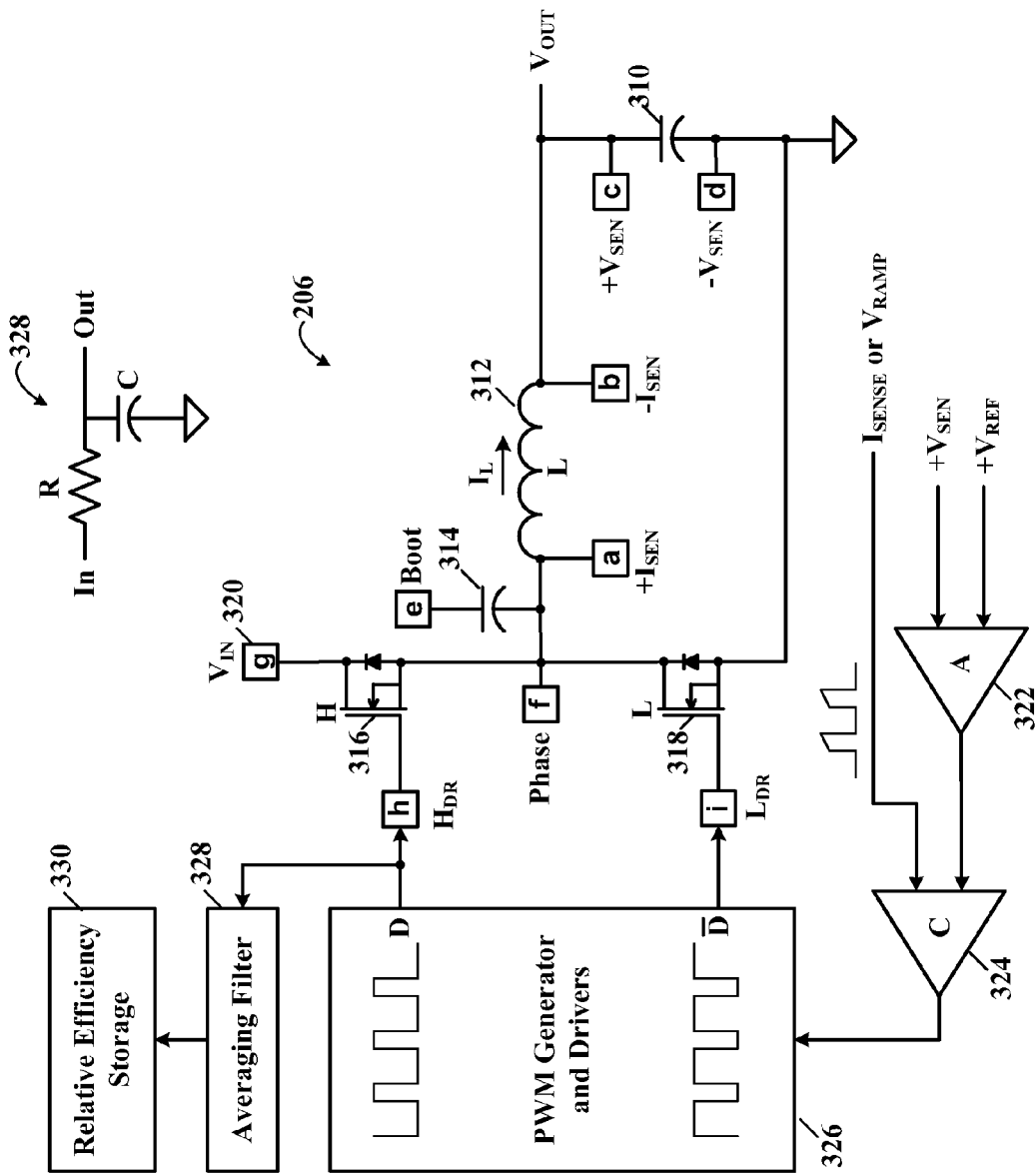
FIG. 3 illustrates a schematic diagram of the circuits shown in FIG. 2 implemented as a switch-mode power supply (SMPS), according to a specific example embodiment of this disclosure.

Referring to FIG. 3, depicted is a schematic diagram of the circuits shown in FIG. 2 implemented as a switch-mode power supply (SMPS), according to a specific example embodiment of this disclosure. The power circuit 206 of the SMPS may receive power from a power source 320, e.g., battery, and may comprise a power inductor 312, high and low switches 316 and 318, respectively, e.g., power field effect transistors; a load capacitor 310 for smoothing alternating current (AC) ripple from the desired direct current (DC) output, and a boot voltage capacitor 314. The power circuit 206 is connected to and is controlled by the control circuit 208 as shown in FIG. 4 and more fully described hereinafter.

The SMPS shown in FIG. 3 may be for example, but not limited to, a voltage mode or current mode analog pulse width modulated (PWM) voltage conversion system. An outer voltage loop is regulated using an amplifier 322 and a comparator 324. An output D of the PWM generator and drivers 326 is adjusted by comparing the output of the amplifier 322 with the inductor 312 ramp current or a generated ramp voltage depending upon the control method chosen. In either case, the value of the PWM output (D) is a relative measure of the SMPS system efficiency. The higher the PWM output (D) average is the lower the efficiency (i.e., the PWM output (D) on time increases and the off time decreases), and the lower the PWM output (D) is the higher the efficiency (i.e., the PWM output (D) on time decreases and the off time increases). This is reflected in and is advantageous for the switching frequency of the SMPS converter to be lowered in frequency, i.e., less switch transitions per second, whereby the inductor 312 maintains a desired current charge with less power transistor switching losses.

For example, if the SMPS converter is stepping down a +12 VDC input to a +1.2 VDC output when the value at the output D is 15% at a switching frequency of 600 kHz, compared to the output D of 14% at a switching frequency of 300 kHz, the SMPS system efficiency has improved. The PWM output D ($H_{DR}$) may be averaged using an analog low pass filter, e.g., resistor-capacitor filter, then measured and stored, e.g., with an analog-to-digital converter (ADC) and a digital memory. The stored average efficiency values may then be compared with a digital processor, e.g., microcontroller, capable of determining relative system efficiencies for different combinations of operating parameters. Other system level adjustments that may be beneficial and advantageous may be, for example but are not limited to, delay time between the on times of the upper and lower switches 316 and 318, and drive strength to the gates thereof (not as much current drive is required when the current through the switches 316 and 318 is lower, all though the switches 316 and 318, e.g., power FETs, are either off or saturated on. It is contemplated and within the scope of this disclosure that the PWM output/D ($L_{DR}$) may also be averaged using an analog low pass filter, e.g., resistor-capacitor filter, then measured and stored, e.g., with the analog-to-digital converter (ADC) and the digital memory. Having on times as percentages of both PWM outputs D ($H_{DR}$) and/D ($L_{DR}$) will further enable operational profiling for efficiency, optimal "dead time," etc. Thus, digital techniques may be used to enhance an analog control system in a simple and cost effective manner. Full digital loop control for determining relative efficiency would require a larger digital circuit size and power drawn, slower transient response and higher quiescent current.

Figure 4:
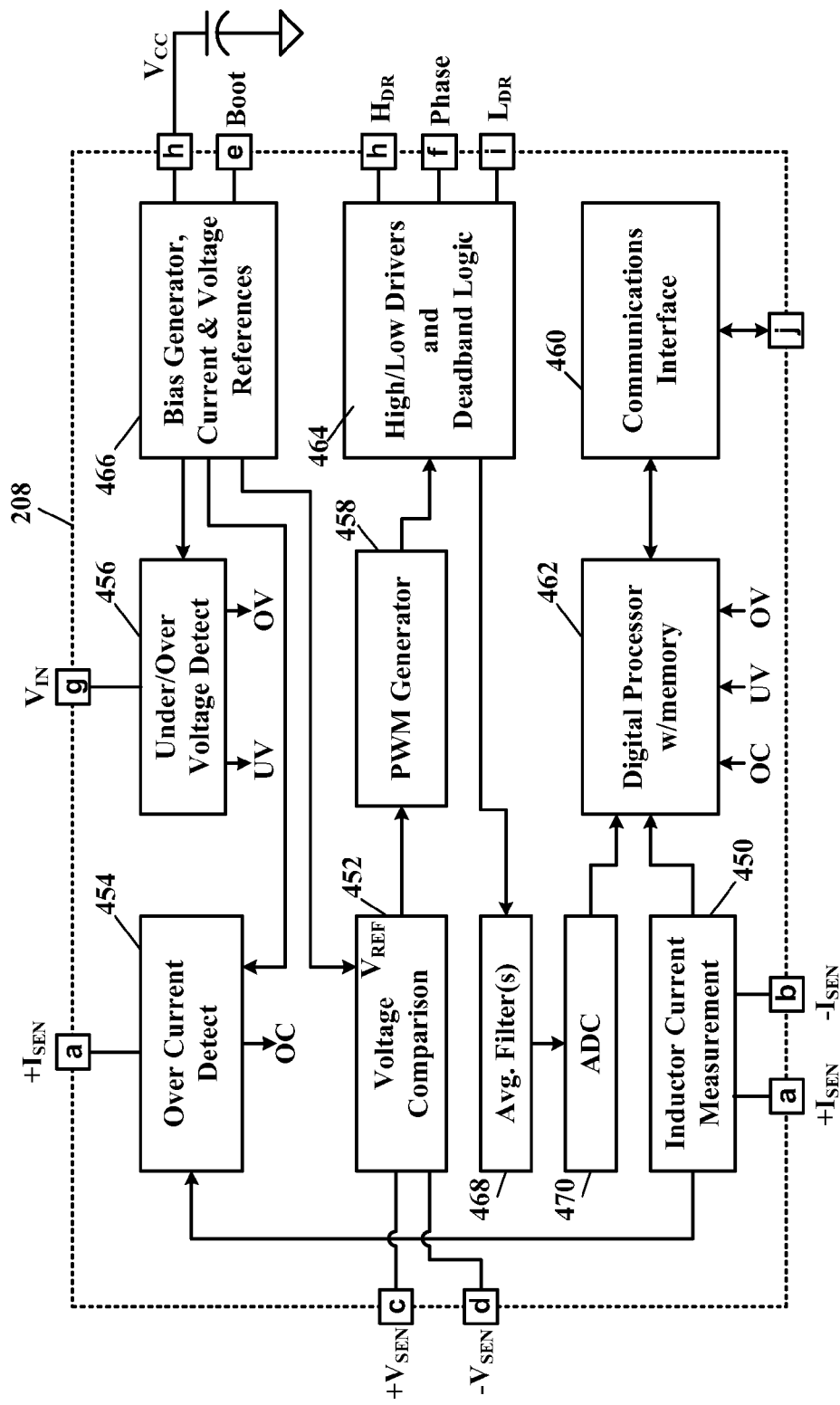
FIG. 4 illustrates a more detailed schematic block diagram of the control circuit shown in FIG. 2, according to the specific example embodiment of this disclosure.

Referring to FIG. 4, depicted is a more detailed schematic block diagram of the control circuit shown in FIG. 2, according to the specific example embodiment of this disclosure. The control circuit 208 is connected to the power circuit 206 shown in FIG. 3 and comprises a digital processor with memory 462, e.g., microcontroller; high and low switch drivers having deadband logic represented by function block 464, bias generator, current and voltage reference circuits 466; under and over voltage detectors 456, a PWM generator 458, an over current detector 454, a voltage comparison circuit 452, a power inductor current measurement circuit 450, an PWM output control averaging circuit(s) 468, an analog-to-digital converter (ADC) 470 and, optionally, a communications interface 460.

The high and low switch drivers of the function block 464 are coupled to and control when the high and low switches 316 and 318 turn on and off. In addition the deadband logic of the function block 464 prevents the high and low switches 316 and 318 from ever being on at the same time, preferably, there is a deadband where both of the high and low switches 316 and 318 are off. The PWM generator 458 controls when and for how long the power inductor 312 is coupled to and is being charged from the power source 320.

The boot voltage capacitor 314 supplies power to the bias generator, current and voltage reference circuits 466 which in turn supply precision current and voltage reference values that are used by the current and voltage circuits 452, 454 and 456. The voltage comparison circuit 452 measures the output voltage and compares it to a reference voltage, $V_{REF}$, from the voltage reference circuit 466. An error signal from the voltage comparison circuit 452, representing the difference between a desired voltage value and the actual output voltage value, is applied to an error input of the PWM generator 458, wherein the PWM generator 458 adjusts its pulse waveform output to minimize that difference (closed loop feedback, see FIG. 1). The over current detector 454 monitors the current to the power inductor 312, and the under and over voltage detectors 456 monitor the input voltage to the SMPS for undesirable e.g., abnormal, conditions, e.g., inductor current exceeds allowable design limits, input voltage is above or below a design operating input voltage range. The power inductor current measurement circuit 450 measures SMPS power inductor current. It is contemplated and within the scope of this disclosure that any method and/or circuit for measuring current through the power inductor 312 may be used, and one having ordinary skill in the design of SMPS systems and having the benefit of this disclosure would understand how to implement such a current measurement circuit. Various inductor current measurement circuits are more fully described in commonly owned U.S. patent application Ser. No. 12/959,837, by Scott Dearborn, filed Dec. 3, 2010, and is incorporated by reference herein for all purposes.

The averaging filter(s) 468 continuously supplies an average value of the PWM control signal to an input of the ADC 470. The ADC 470 converts the average value of the PWM control signal(s) to digital values that are periodically sampled by and stored in the memory of the digital processor 462. From these stored averages, a determination can be made, e.g., with an optimization program running in the digital processor with memory 462, for the most efficient combination(s) of operating parameters to run the SMPS system at any input voltage of load, e.g., frequency on and off times of the control signals, $H_{DR}$ and/or $L_{DR}$, including dead times between $H_{DR}$ and $L_{DR}$ control signals.

While embodiments of this disclosure have been depicted, described, and are defined by reference to example embodiments of the disclosure, such references do not imply a limitation on the disclosure, and no such limitation is to be inferred. The subject matter disclosed is capable of considerable modification, alteration, and equivalents in form and function, as will occur to those ordinarily skilled in the pertinent art and having the benefit of this disclosure. The depicted and described embodiments of this disclosure are examples only, and are not exhaustive of the scope of the disclosure.

What is claimed is:

1. A switch-mode power supply (SMPS), comprising:
   at least one power switch coupled to a voltage source;
   a power inductor coupled to the at least one power switch;
   a filter capacitor coupled to a load side of the power inductor that provides a regulated voltage output of the SMPS;
   at least one driver coupled to the at least one power switch;
   a pulse width modulation (PWM) generator having at least one output coupled to and controlling the at least one driver, the at least one output of the PWM generator providing at least one PWM signal comprising a plurality of pulses;
   a digital processor having a memory, the digital processor is coupled to and provides operating parameters to the PWM generator during operation thereof;
   a voltage comparison circuit for comparing the regulated output voltage to a reference voltage, wherein the voltage comparison circuit has an error signal output representative of a difference between the regulated output voltage and the reference voltage;
   a comparator having a first input coupled to the error signal output from the voltage comparison circuit, a second input coupled to a ramp signal, and an output coupled to an input of the PWM generator;
   a low pass filter, wherein the low pass filter receives the at least one PWM signal fed to the at least one power switch and produces an analog signal representative of a relative efficiency thereof; and an analog-to-digital converter (ADC) having an analog input coupled to the analog signal representative of the relative efficiency of the PWM signal, and a digital output coupled to the digital processor having a memory;

wherein the digital processor optimizes operation of the SMPS by adjusting operating parameters of the PWM generator to provide the at least one PWM signal that produces a highest relative efficiency of the SMPS.

2. The SMPS according to claim 1, wherein the highest relative efficiency is when the analog signal representative of the relative efficiency is at a lowest value.

3. The SMPS according to claim 1, wherein the ramp signal represents current values of the power inductor.

4. The SMPS according to claim 1, wherein the ramp signal represents a generated voltage ramp.

5. The SMPS according to claim 1, wherein the digital processor stores in the memory digital efficiency values from the digital output of the ADC.

6. The SMPS according to claim 5, wherein the digital processor uses the stored digital efficiency values to adjust the operating parameters of the PWM generator to provide the PWM signal resulting in optimum relative efficiency of the SMPS.

7. The SMPS according to claim 1, wherein the operating parameters of the PWM generator are selected from any one or more of the group consisting of on and off percents of the at least one power switch, drive current from the at least one driver to the at least one power switch, and PWM pulse rate per second (frequency).

8. The SMPS according to claim 1, wherein the at least one power switch is at least one power transistor.

9. The SMPS according to claim 8, wherein the at least one power transistor is at least one power metal oxide semiconductor (MOS) field effect transistor (FET).

10. The SMPS according to claim 1, wherein the low pass filter is coupled to the at least one driver for receiving the PWM signal.

11. The SMPS according to claim 1, wherein the analog low-pass filter is a resistor-capacitor low-pass filter.

12. The SMPS according to claim 1, further comprising a communications interface coupled to the digital processor.

13. The SMPS according to claim 1, wherein the digital processor and memory is a microcontroller.

14. A switch-mode power supply (SMPS), comprising:
a first power switch coupled to a voltage source;
a second power switch coupled between the first power switch and a voltage source return;
a power inductor coupled to the first and second power switches;
a filter capacitor coupled to a load side of the power inductor that provides a regulated voltage output of the SMPS;
a first driver coupled to the first power switch;
a second driver coupled to the second power switch;
a pulse width modulation (PWM) generator having first and second outputs coupled to and controlling the first and second drivers, respectively, the first and second outputs of the PWM generator providing first and second PWM signals, each comprising a plurality of pulses;
a digital processor having a memory, the digital processor is coupled to and provides operating parameters to the PWM generator during operation thereof;
a voltage comparison circuit for comparing the regulated output voltage to a reference voltage, wherein the voltage comparison circuit has an error signal output representative of a difference between the regulated output voltage and the reference voltage;
a comparator having a first input coupled to the error signal output from the voltage comparison circuit, a second input coupled to a ramp signal, and an output coupled to an input of the PWM generator;
a first low pass filter, the first low pass filter receives the first PWM signal and produces a first analog signal representative of a relative efficiency thereof; and
an analog-to-digital converter (ADC) having an analog input coupled to the first analog signal representative of the relative efficiency of the first PWM signal, and a digital output coupled to the digital processor having a memory;
wherein the digital processor optimizes operation of the SMPS by adjusting operating parameters of the PWM generator to provide the first and second PWM signals that produce a highest relative efficiency of the SMPS.

15. The SMPS according to claim 14, wherein the highest relative efficiency is when the analog signal representative of the relative efficiency is at a lowest value.

16. The SMPS according to claim 14, wherein the ramp signal represents current values of the power inductor.

17. The SMPS according to claim 14, wherein the ramp signal represents a generated voltage ramp.

18. The SMPS according to claim 14, wherein the digital processor stores in the memory digital efficiency values from the digital output of the ADC.

19. The SMPS according to claim 18, wherein the digital processor uses the stored digital efficiency values to adjust the operating parameters of the PWM generator to provide the PWM signal resulting in optimum relative efficiency of the SMPS.

20. The SMPS according to claim 14, wherein the operating parameters of the PWM generator are selected from any one or more of the group consisting of on and off percentages of the first power switch, on and off percentages of the second power switch, drive current from the first driver to the first power switch, drive current from the second driver to the second power switch, off times between on times of the first and second PWM signals, and PWM pulse rate per second (frequency).

21. The SMPS according to claim 14, further comprising a second low pass filter, the second low pass filter receives the second PWM signal and produces a second analog signal representative of a relative efficiency thereof, wherein the second analog signal is coupled to another analog input of the ADC.

22. The SMPS according to claim 21, wherein the second low pass filter is coupled to the second driver for receiving the second PWM signal.

23. The SMPS according to claim 14, wherein the first and second power switches are power transistors.

24. The SMPS according to claim 23, wherein the power transistors are power metal oxide semiconductor (MOS) field effect transistors (FETs).

25. The SMPS according to claim 14, wherein the first low pass filter is coupled to the first driver for receiving the first PWM signal.

26. The SMPS according to claim 14, wherein the analog low-pass filter is a resistor-capacitor low-pass filter.

27. The SMPS according to claim 14, further comprising a communications interface coupled to the digital processor.

28. The SMPS according to claim 14, wherein the digital processor and memory is a microcontroller.

29. A method for optimizing efficiency of a switch-mode power supply (SMPS), said method comprising the steps of:

generating a PWM signal by a PWM generator and feeding the PWM signal as a control signal to a switching transistor of the switch-mode power supply;

determining an average of on pulses of the PWM signal by low pass filtering the PWM signal and by converting the low pass filtered PWM signal into a digital signal;

driving a power switch of a SMPS with the PWM signal; and adjusting operating parameters of the PWM generator based on the digital signal to minimize the average of the on pulses of the PWM signal and thereby increase efficiency of the SMPS.

30. The method according to claim 29, wherein the operating parameters of the PWM generator are selected from any one or more of the group consisting of percent on of the pulses of the PWM signal, drive current to a power switch, and PWM pulse rate per second (frequency).

31. A method for optimizing efficiency of a switch-mode power supply (SMPS) controller, said method comprising the steps of:

driving a high side power switch of a SMPS with a first PWM signal generated by a PWM generator;

driving a low side power switch of the SMPS with a second PWM signal generated by the PWM generator;

determining an average of on pulses of the first PWM signal by feeding the first PWM signal to a low pass filter and by the converting the low pass filtered first PWM signal into a first digital signal; and adjusting operating parameters of the PWM generator based on the first digital signal to minimize the average of the on pulses of the first PWM signal and thereby increase efficiency of a SMPS.

32. The method according to claim 31, wherein the operating parameters of the PWM generator are selected from any one or more of the group consisting of percent on times of the pulses of the PWM signal, drive current to the first power switch, drive current to the second power switch, off times between on times of the first and second power switches, and PWM pulse rate per second (frequency).

33. The method according to claim 31, further comprising the steps of:

determining an average of on pulses of the second PWM signal from the PWM generator by low pass filtering the second PWM signal and by converting the low pass filtered second PWM signal into a second digital signal; and adjusting operating parameters of the PWM generator based on the second digital signal to minimize the average of the on pulses of the second PWM signal and thereby increase efficiency of the SMPS.

34. A method for optimizing operation of a switch-mode power supply (SMPS), said method comprising the steps of:

providing at least one power switch coupled to a voltage source;

providing a power inductor coupled to the at least one power switch;

providing a filter capacitor coupled to a load side of the power inductor that provides a regulated voltage from the SMPS; and providing a SMPS controller, wherein operating the SMPS controller comprises the steps of:

driving the at least one power switch with an associated at least one driver, controlling the at least one driver with a pulse width modulation (PWM) signal from a PWM generator, comparing the regulated voltage from the SMPS to a reference voltage with a voltage comparison circuit, generating a voltage error signal representative of a difference between the regulated voltage and the reference voltage with the voltage comparison circuit, coupling the voltage error signal to the PWM generator, low pass filtering the PWM signal with a low pass filter and converting the low pass filtered PWM signal into a digital signal; and adjusting operating parameters of the PWM generator based on the digital signal to minimize the average of the on pulses of the PWM signal and thereby increase efficiency of the SMPS.

35. The method according to claim 34, wherein the operating parameters of the PWM generator are selected from any one or more of the group consisting of percent on of the pulses of the PWM signal, drive current to the at least one power switch, and PWM pulse rate per second (frequency).

36. A method for optimizing operation of a switch-mode power supply (SMPS), said method comprising the steps of:

providing a first power switch coupled to a voltage source;

providing a second power switch coupled between the first power switch and a voltage source return;

providing a power inductor coupled to the first and second power switches;

providing a filter capacitor coupled to a load side of the power inductor that provides a regulated voltage from the SMPS; and providing a SMPS controller, wherein operating the SMPS controller comprises the steps of:

driving the first power switch with a first driver, driving the second power switch with a second driver, controlling the first and second drivers with first and second pulse width modulation (PWM) signals, respectively, from a PWM generator, comparing the regulated voltage from the SMPS to a reference voltage with a voltage comparison circuit, generating a voltage error signal representative of a difference between the regulated voltage and the reference voltage with the voltage comparison circuit, coupling the voltage error signal to the PWM generator, low pass filtering the first PWM signal with a first low pass filter and converting the low pass filtered first PWM signal into a first digital signal; and adjusting operating parameters of the PWM generator based on the first digital signal to minimize the average of the on pulses of the first PWM signal and thereby increase efficiency of the SMPS.

37. The method according to claim 36, wherein the operating parameters of the PWM generator are selected from any one or more of the group consisting of percent on times of the pulses of the first and second PWM signals, drive currents to the first and second power switches, off times between on times of the first and second power switches, and PWM pulse rate per second (frequency).

38. The method according to claim 36, further comprising the steps of:

low pass filtering the second PWM signal from the PWM generator with a second low pass filter and converting the low pass filtered second PWM signal into a second digital signal; and adjusting operating parameters of the PWM generator based on the second digital signal to minimize the average of the on pulses of the second PWM signal and thereby increase efficiency of the SMPS.

* * * * *